(12) United States Patent
Fossum (10) Patent No.: US 7,385,166 B2
(45) Date of Patent: Jun. 10, 2008

(54) IN-PIXEL KTC NOISE SUPPRESSION USING CIRCUIT TECHNIQUES

(75) Inventor: Eric R. Fossum, La Canada, CA (US)

(73) Assignee: Micron Technology, Inc., Boise, ID (US)

( * ) Notice: Subject to any disclaimer, the term of this patent is extended or adjusted under 35 U.S.C. 154(b) by 335 days.

(21) Appl. No.: 10/696,560

(22) Filed: Oct. 30, 2003

(65) Prior Publication Data

US 2005/0092895 A1    May 5, 2005

(51) Int. Cl.
*H01L 27/00* (2006.01)
(52) U.S. Cl. .............. 250/208.1; 348/308; 257/290
(58) Field of Classification Search ............ 250/208.1; 348/297, 302, 308; 257/290–292
See application file for complete search history.

(56) References Cited

U.S. PATENT DOCUMENTS

| 5,461,425 | A | 10/1995 | Fowler et al. |
| 5,981,932 | A | 11/1999 | Guerrieri et al. |
| 6,317,154 | B2 | 11/2001 | Beiley |
| 6,320,617 | B1 | 11/2001 | Gee et al. |
| 6,515,702 | B1 * | 2/2003 | Yadid-Pecht et al. ....... 348/308 |
| 6,940,551 | B2 * | 9/2005 | Merrill ...................... 348/301 |
| 2002/0190215 | A1 | 12/2002 | Tashiro et al. |

OTHER PUBLICATIONS

"100,000 Pixel 120dB Imager in TFA-Technology," T. Lulé et al., 1999 Symposium on VLSI Circuits, Kyoto, Japan, Jun. 17-19, 1999, 4 pp.
"Intra-Pixel Reset Noise Cancellation," R. Merrill et al., 2001 IEEE Workshop on Charge-Coupled Devices and Advanced Image Sensors, Lake Tahoe, Nevada, Jun. 7-9, 2001, pp. 1 and 153-156.

* cited by examiner

*Primary Examiner*—Kevin Pyo
(74) *Attorney, Agent, or Firm*—Dickstein Shapiro LLP (57) ABSTRACT

A circuit and method for reducing kTC noise in CMOS imagers while minimizing power dissipation is disclosed. Correlated double sampling (CDS) is performed within each pixel such that the reset voltage and the integration voltage are sampled and stored within the pixel until the voltages are forwarded to a differential amplifier for subtraction.

14 Claims, 11 Drawing Sheets

IN-PIXEL KTC NOISE SUPPRESSION USING CIRCUIT TECHNIQUES

FIELD OF THE INVENTION

The present invention relates generally to complementary metal oxide semiconductor (CMOS) imagers, and more particularly to kTC noise suppression circuits for use with CMOS imagers.

BACKGROUND OF THE INVENTION

Image sensors are used in a variety of different types of digital image capture systems, including products such as scanners, copiers, and digital cameras. The image sensor is typically composed of an array of light-sensitive pixels that are electrically responsive to incident light reflected from an object or scene whose image is to be captured.

The performance of an image capture system depends in large part on the sensitivity of each individual pixel in the sensor array and its immunity from noise. Pixel sensitivity is defined here as being related to the ratio of a change in the pixel output voltage to the photogenerated charge in the pixel. Noise can be caused by a variety of known sources. An image sensor with increased noise immunity yields sharper, more accurate images in the presence of environmental and other noise.

Improving the sensitivity of each pixel permits a reduction in exposure time which in turn allows the capture of images at a greater rate. This allows the image capture system to capture motion in the scene. In addition, higher pixel sensitivity also helps to capture acceptable quality images under low light conditions.

One way to increase pixel sensitivity is to increase the efficiency of the photodiode by changing the photodiode response characteristics. Doing so, however, can require deviating from a standard CMOS integrated circuit fabrication process, thereby further increasing the cost of manufacturing the image sensor circuit.

The individual pixels of a CMOS imager sensor array typically contain a photodiode or phototransistor as a light detecting element. Photogenerated charges are collected in accordance with the intensity of light illuminating the photodiode or phototransistor. An analog signal is generated from the collected charges having a magnitude approximately proportional to the intensity of light illuminating the light detecting element.

Figure 1:
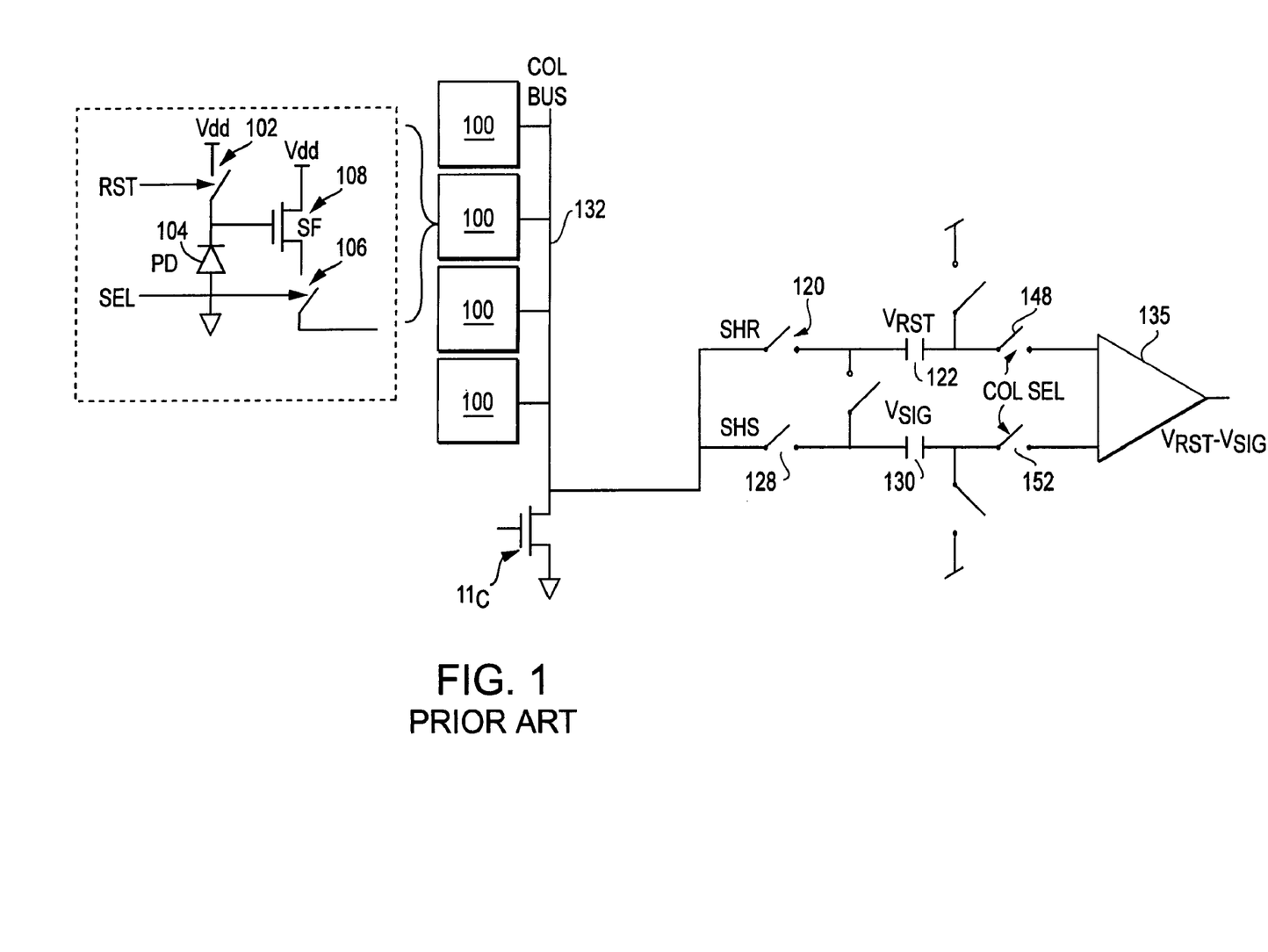
FIG. 1 depicts a simplified schematic diagram of a conventional pixel array.

With reference to FIG. 1, a portion of a conventional pixel sensor array is depicted. The pixel sensor array contains a plurality of pixels 100 where each pixel 100 contains a reset transistor 102, a first terminal of which is coupled to a source voltage terminal (e.g., Vdd), a second terminal of which is coupled to a photodiode 104. The second terminal of reset transistor 102 is also coupled to a gate of source-follower transistor 108. A first source/drain terminal of s is also coupled to the source voltage terminal (e.g., Vdd). A second source/drain terminal of source-follower transistor 108 is coupled to a row select transistor 106.

Row select transistor 106 is coupled to the column bus 132, which is coupled to a dual-stage sample and hold (SH) circuit. A first SH circuit (SHR) consists of a first SH transistor 120. SH transistor 120 is also coupled to a first storage capacitor 122 and also coupled to column select switch 148. Switch 148 is also coupled to an input of differential amplifier 135.

A second SH circuit (SHS) consists of a second SH transistor 128. SH transistor 128 is also coupled to a second storage capacitor 130 and also coupled to column select switch 152. Switch 152 is also coupled to an input of differential amplifier 135. The output of differential amplifier 135 provides the difference between the reset voltage ($V_{RST}$) and the integration, or signal voltage $V_{SIG}$.

During operation, the photodiode 104 is reset by activating reset transistor 102, thereby resetting the charge collection node of the photodiode 104 to the source voltage (e.g., Vdd). The reset transistor 102 is then deactivated and the photodiode 104 is then exposed to incident light during an integration period. During the integration period, the photodiode discharges the reset voltage in proportion to the intensity of the incident light.

The row select transistor 106 is then activated and the photodiode signal $V_{SIG}$ is transferred to the column bus 132 and to the second SH circuit (SHS) where the charge is stored on storage capacitor 130.

The photodiode 104 is reset again and the reset voltage level $V_{RST}$ stored by the photodiode 104 is then transferred to the first SH circuit and stored in storage capacitor 122.

Thereafter, the two respective values stored by capacitors 122 and 130, namely, a reset voltage $V_{RST}$ and a signal voltage $V_{SIG}$, are subtracted and the difference between the two voltage levels indicates the level of exposure of the photodiode 104 to the incident light.

Some limitations on the above-described double sampling process do exist, however. For instance, the measurement of the amount of light detected by the photodiode 104 is limited due to noise that is generated by the switching of the reset transistor 102. That noise, "kTC noise," where k is Boltzmann's constant, T is temperature in degrees Kelvin, and C is the size of the intrinsic capacitance of the photodiode 104 in Farads, is fundamentally present whenever a capacitor is set to a voltage due to fluctuations in the number of electrons present in the capacitor's "sea of electrons."

One way to suppress kTC noise is to perform correlated double sampling (CDS) on the pixel. CDS is similar to the process described above except that the sample of the pixel reset voltage and the sample of the integration voltage are taken from the same frame.

During operation, the photodiode 104 is reset by activating reset transistor 102, thereby resetting the charge collection node of photodiode 104 to the source voltage (e.g., Vdd). The reset voltage is then sampled and stored. The reset transistor 102 is then activated again to reset the photodiode 104 and the photodiode 104 is then exposed to incident light during an integration period. During the integration period, the photodiode discharges the reset voltage in proportion to the intensity of the incident light. The resulting integration or signal voltage is then sampled and stored. Thereafter, the reset voltage and signal voltage are subtracted in order to determine the magnitude of light exposure of the photodiode during integration.

While CDS is known in the art to reduce kTC noise in CMOS imagers, CDS is typically performed sequentially for each pixel on a column by a common pair of sample and hold (SH) circuits, such as SHR and SHS of FIG. 1.

More recently, efforts have been made to perform CDS, and thereby reduce kTC noise, with circuitry located within each individual pixel, rather than on the column line. The process is described in a paper by R. Morrill, entitled "Intra-Pixel Reset Noise Cancellations," distributed at the 2001 IEEE Workshop on Charge Coupled Devices and Advanced Image Sensors, Jun. 7-9, 2001, Lake Tahoe, Nev., the contents of which are incorporated herein by reference.

With reference to the Morrill paper, one of the major drawbacks is that an inordinate amount of power is consumed within the pixel in performing CDS. For example, the power dissipation required to maintain the bias voltage on N4 (in FIG. 1 of the Morrill paper) is excessive. Thus, it is desirable to reduce kTC noise generated within a pixel circuit without consuming excessive power.

BRIEF SUMMARY OF THE INVENTION

The present invention provides a circuit and method for reducing kTC noise in CMOS imagers while minimizing power dissipation. Correlated double sampling (CDS) is performed within each pixel such that the reset voltage and the integration voltage are sampled and stored within the pixel until the voltages are forwarded to a differential amplifier for subtraction.

BRIEF DESCRIPTION OF THE DRAWINGS

The above and other features and advantages of the invention will be more readily understood from the following detailed description of the invention which is provided in connection with the accompanying drawings.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those of ordinary skill in the art to make and use the invention, and it is to be understood that structural, logical or procedural changes may be made to the specific embodiments disclosed without departing from the spirit and scope of the present invention.

Figure 2:
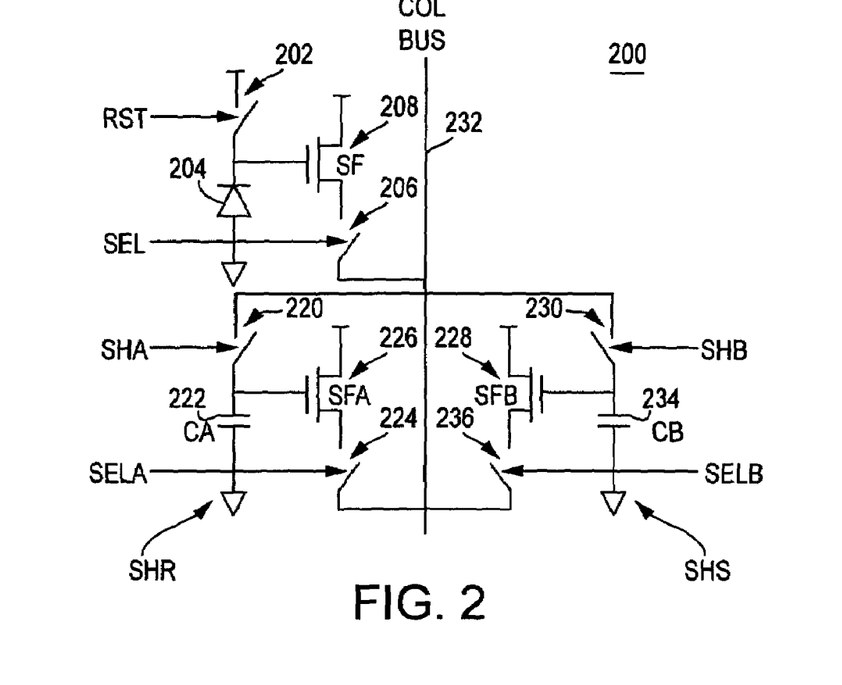
FIG. 2 depicts a schematic diagram of a pixel, in accordance with an exemplary embodiment of the invention.

FIG. 2 depicts a schematic diagram of a pixel 200, in accordance with an exemplary embodiment of the invention. The pixel 200 consists of three sections. The upper section consists of a reset transistor 202, a photosensitive element (e.g., a photodiode) 204, a source-follower transistor 208 and a row select transistor 206 coupled to a column bus 232. The lower portion of the pixel 200 is made up of two sample and hold (SH) circuits.

The first SH circuit, reset sample and hold (SHR), contains a SH transistor 220, a first terminal of which is coupled to the column bus 232 and a second terminal of which is coupled to a storage capacitor 222. The second terminal of transistor 220 is also coupled to a gate of source-follower transistor 226. First and second terminals of source-follower transistor 226 are respectively coupled to the source voltage terminal (e.g. Vdd) and to a select transistor 224.

The second SH circuit, signal sample and hold (SHS), contains a SH transistor 230, a first terminal of which is coupled to the column bus 232 and a second terminal of which is coupled to a storage capacitor 234. The second terminal of transistor 230 is also coupled to a gate of source-follower transistor 228. First and second terminals of source-follower transistor 228 are respectively coupled to the source voltage terminal (e.g. Vdd) and to a select transistor 236.

In accordance with an exemplary embodiment of the invention, true correlated double-sampling circuitry is incorporated into each pixel 200. As described above, CDS is instrumental in reducing kTC noise in CMOS imagers. In accordance with an exemplary embodiment of the invention, each pixel 200 contains not only a charge collection portion, but also includes a charge storage portion for storing both the reset voltage and the integration voltage. Further, in accordance with the invention, CDS is performed in-pixel and without excessive power dissipation.

Figure 3:
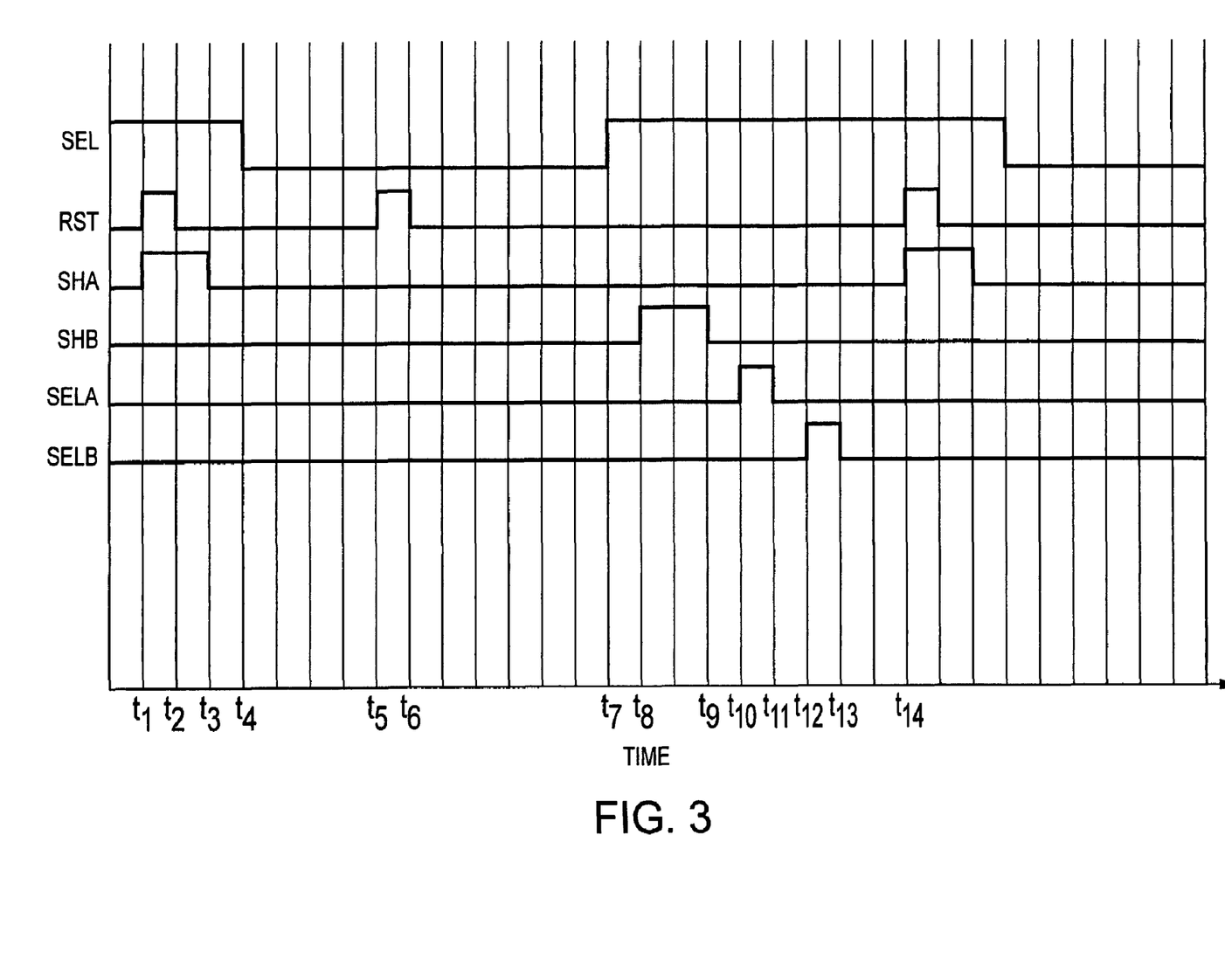
FIG. 3 is a timing diagram describing the operation of the FIG. 2 pixel.

Turning now to FIG. 3, a timing diagram describing the operation of the FIG. 2 pixel is depicted. At $t_1$ the RST, SEL and SHA signals are logic HIGH, at $t_2$ RST is logic LOW, at $t_3$ SHA is logic transistors 202, 206 and 220 are conducting during the resetting of the photodiode 204. The voltage of the fully charged photodiode 204 is stored on capacitor 222 of SHR. At $t_5$ RST is logic HIGH and at $t_6$ RST is logic LOW, thus the photodiode 204 is reset to the supply voltage (e.g., Vdd). The integration period occurs between $t_6$ and $t_7$. At $t_7$ SEL is logic HIGH and at $t_8$ SHB is logic HIGH, thereby enabling the storage of the integration (or signal) voltage on capacitor 234 of SHS. At $t_9$ SHB is logic LOW, thereby disabling SHS. At $t_{10}$ and $t_{12}$ SELA and SELB are respectively switched to logic HIGH and at $t_{11}$ and $t_{13}$, they are respectively switched back to logic LOW, thereby performing the readout of the charges respectively stored by capacitors 222 and 234. These respective charges are then forwarded to a differential amplifier (not shown) and subtracted to determine the level of exposure of the pixel to incident light. At time $t_{14}$ the process begins again for a subsequent frame.

The noise suppression factor (NSF) of the present invention is given by $NSF=(Ca/Cpd)^{1/2}*Gsf$, where Ca is the capacitance of the storage capacitor 222 in the first SH circuit, SHR, Cpd is the capacitance of the photodiode 204 and Gsf is the gain of the source-follower transistor 226. Assuming Cpd=2fF, Ca=20fF, and Gsf=0.8, NSF=2.5, corresponding to an input referred noise (including kTC and FPN) that is reduced from approximately 25 e-rms to approximately 10 e-rms.

Figure 4:
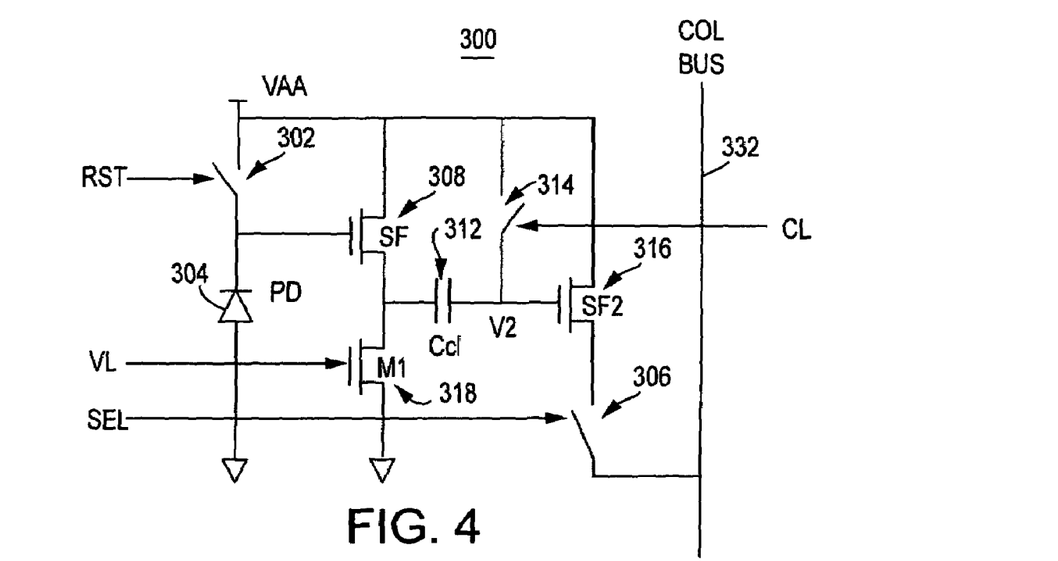
FIG. 4 depicts a schematic diagram of a pixel, in accordance with a second exemplary embodiment of the invention.

Turning now to FIG. 4, a simplified schematic diagram of a pixel 300, in accordance with a second exemplary embodiment of the invention is depicted. Similarly to the pixel 200 of FIG. 2, pixel 300 contains a reset transistor 302 coupled to a supply voltage terminal (e.g., VAA) and also coupled to a photodiode 304. In addition, the reset transistor 302 is coupled to a gate of a source-follower transistor 308. A first source/drain terminal of source-follower transistor 308 is coupled to VAA and a second source/drain terminal of source-follower transistor 308 is coupled to a first source/drain terminal of load transistor 318. A second source/drain terminal of load transistor 318 is coupled to ground and the gate of load transistor 318 is coupled to receive a bias voltage VL.

The second source/drain terminal of source-follower transistor 308 is coupled to clamp capacitor 312. Clamp capacitor 312 is in turn coupled to clamp switch 314 and also coupled to a gate of second source-follower transistor 316. A first source/drain terminal of the second source-follower transistor 316 is coupled to VAA and the second source/drain terminal of the second source-follower transistor 316 is coupled to a select transistor 306.

Figure 5:
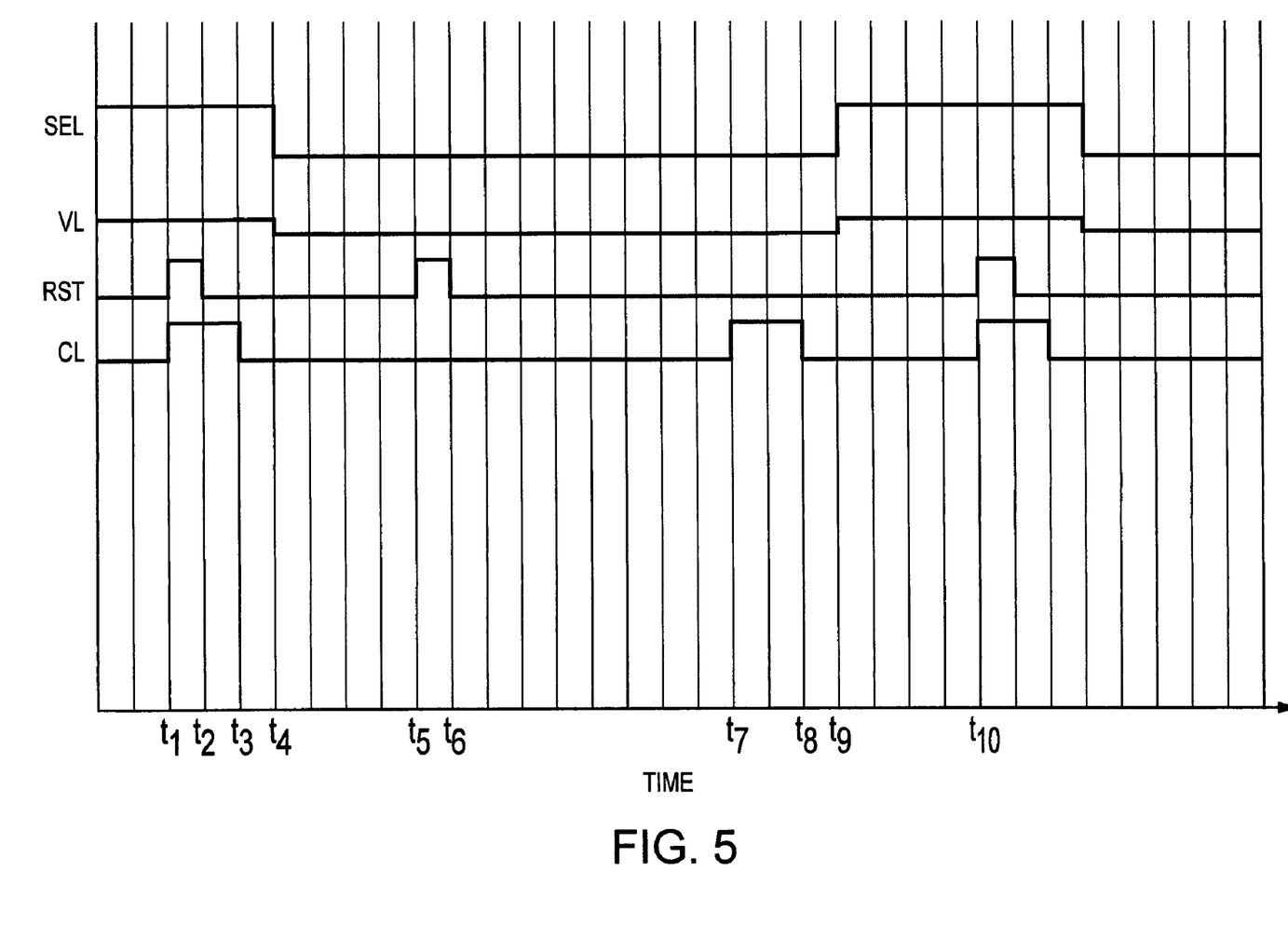
FIG. 5 is a timing diagram describing the operation of the FIG. 4 pixel.

Turning to FIG. 5, the operation of the FIG. 4 pixel is described. At $t_1$ SEL, VL, RST and CL are logic HIGH. At $t_2$ RST is logic LOW. At $t_3$ CL is logic LOW and at $t_4$ SEL and VL are logic LOW. As a result, at $t_4$ the reset voltage has been stored on capacitor 312 and read out onto the column bus 332.

At $t_5$ RST goes logic HIGH and at $t_6$ RST goes logic LOW, thereby resetting the photodiode 304 for the integration period between $t_6$ and $t_7$. At $t_7$ CL goes logic HIGH and the signal voltage is stored onto capacitor 312. At $t_8$ CL goes logic LOW and at $t_9$ SEL and VL go logic HIGH and the signal voltage stored on capacitor 312 is read onto column bus 332. Similarly to the FIG. 2 pixel, the FIG. 4 pixel forwards the reset voltage and the signal voltage to a differential amplifier for subtraction. At $t_{10}$ the process begins again for the next frame.

Figure 6:
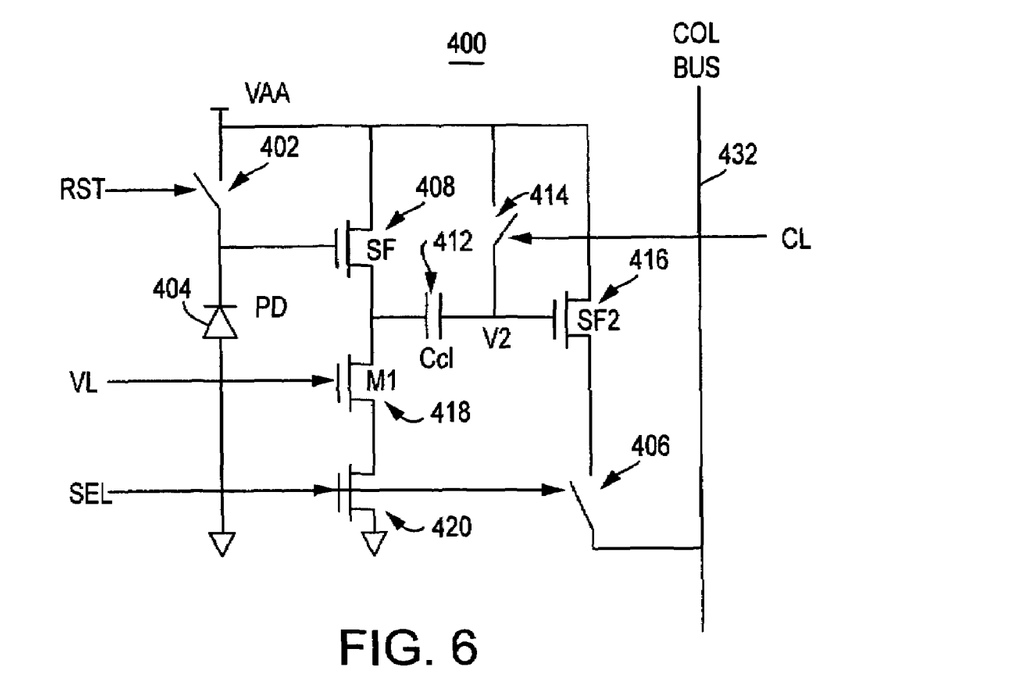
FIG. 6 depicts a schematic diagram of a pixel, in accordance with a third exemplary embodiment of the invention.

Turning now to FIG. 6, a schematic diagram of a pixel 400, in accordance with a third exemplary embodiment of the invention is depicted. The FIG. 6 pixel 400 is essentially identical to that of FIG. 4 except for the fact that the signal VL is configured to be constantly applied to load transistor 418 which can improve noise characteristics of the pixel 400 as compared with applying a switched voltage VL (as in FIG. 3). In addition, a selection, or activation, transistor 420 is added in series with load transistor 418. Selection transistor 420 is activated only when the pixel 400 is selected, thereby preventing any charge leakage to ground before the pixel 400 is selected to be read out.

Figure 7:
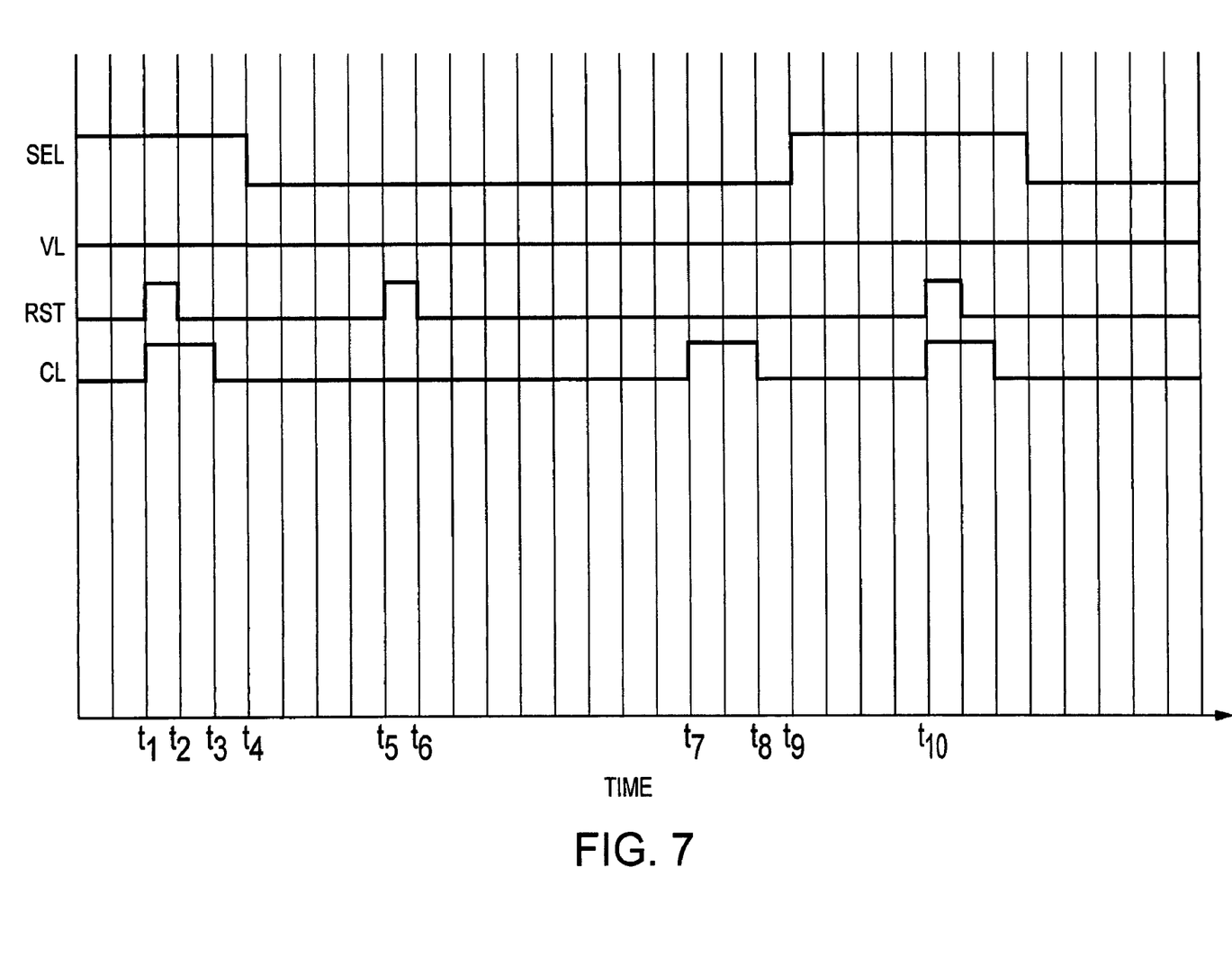
FIG. 7 is a timing diagram describing the operation of the FIG. 6 pixel.

Turning to the FIG. 7 timing diagram, it is identical to that of FIG. 5 except for the fact that VL is asserted logic HIGH at all times.

Figure 8:
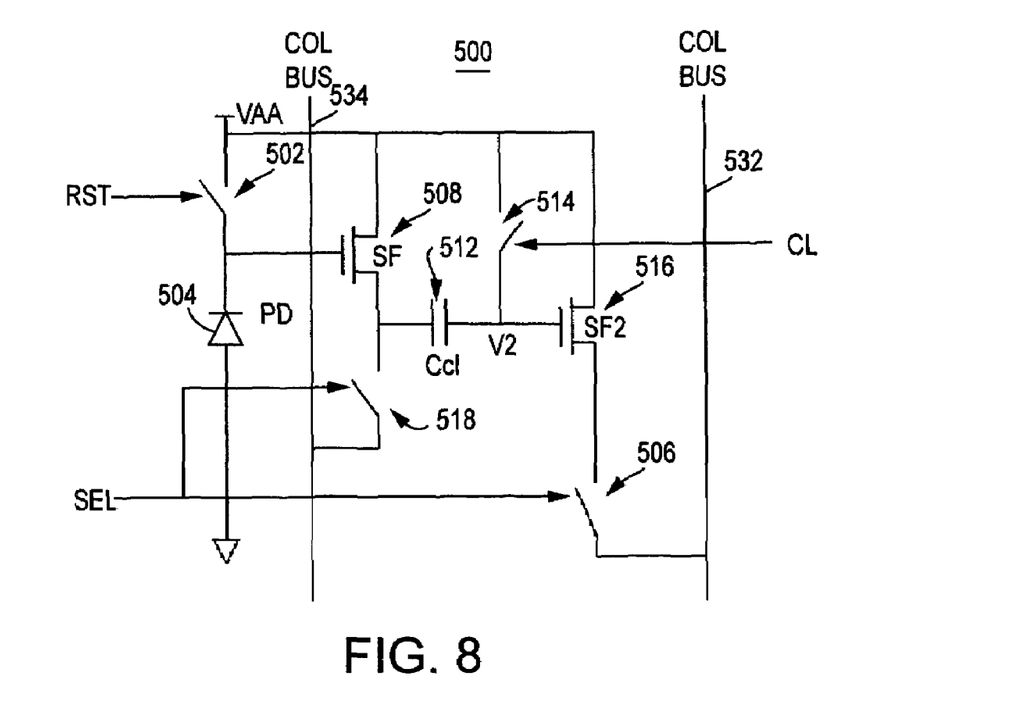
FIG. 8 depicts a schematic diagram of a pixel, in accordance with a fourth exemplary embodiment of the invention.

Turning to FIG. 8, a schematic diagram of a pixel 500, in accordance with a fourth exemplary embodiment of the invention is depicted. The FIG. 8 pixel 500 differs from the FIG. 6 pixel 400 in that it does not contain the load transistor 418 and it does not contain the selection transistor 420. Rather, a switch 518 replaces the load transistor 418 and the selection transistor 420 is replaced by a secondary column bus 534. This embodiment eliminates the need to have VL routed, or otherwise applied, to each pixel and provides a redundant column bus which may be desirable in specific applications.

Figure 9:
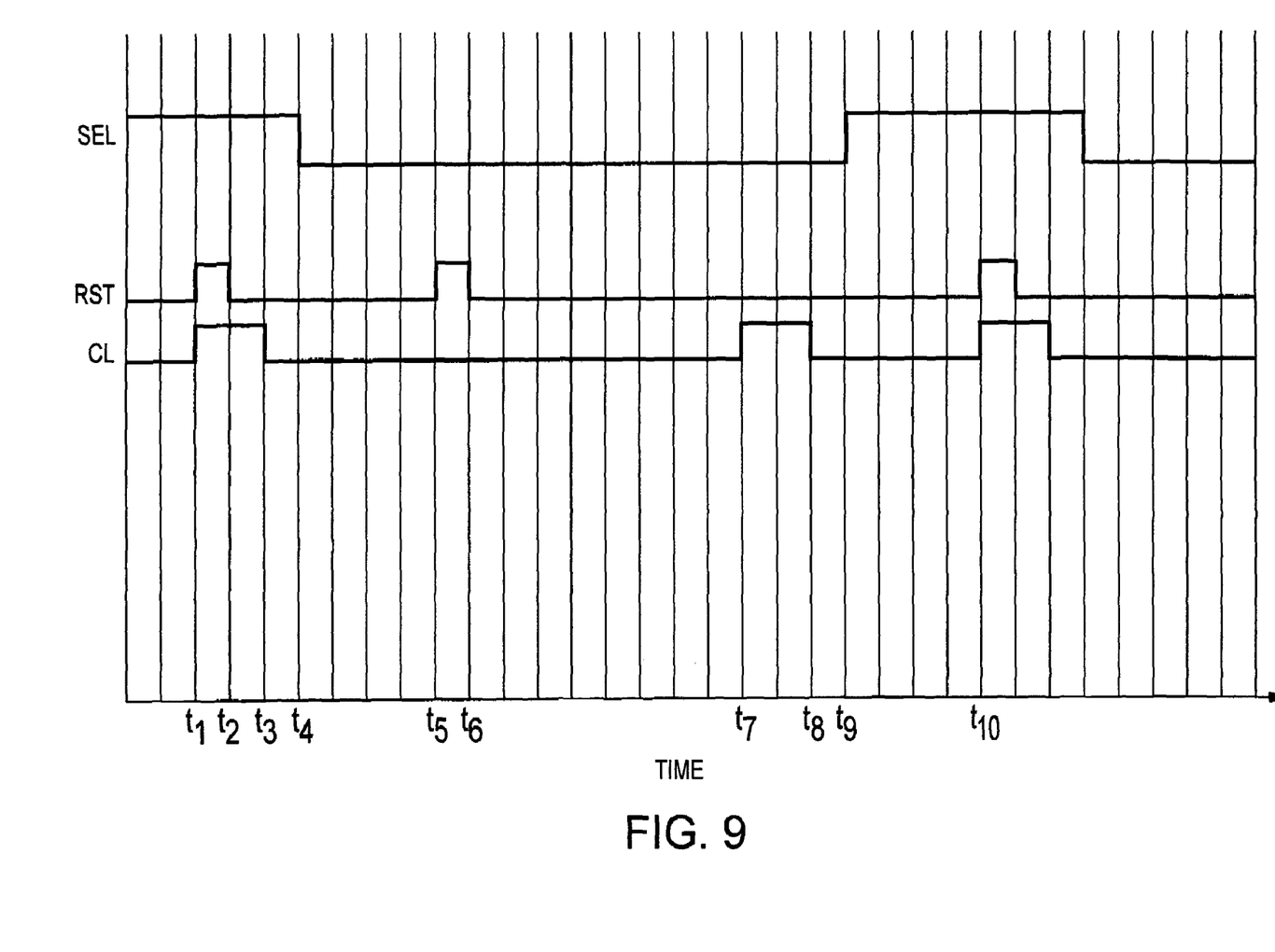
FIG. 9 is a timing diagram describing the operation of the FIG. 8 pixel.

Turning to the FIG. 9 timing diagram, it is identical to that of FIG. 7 except that VL is eliminated.

Figure 10:
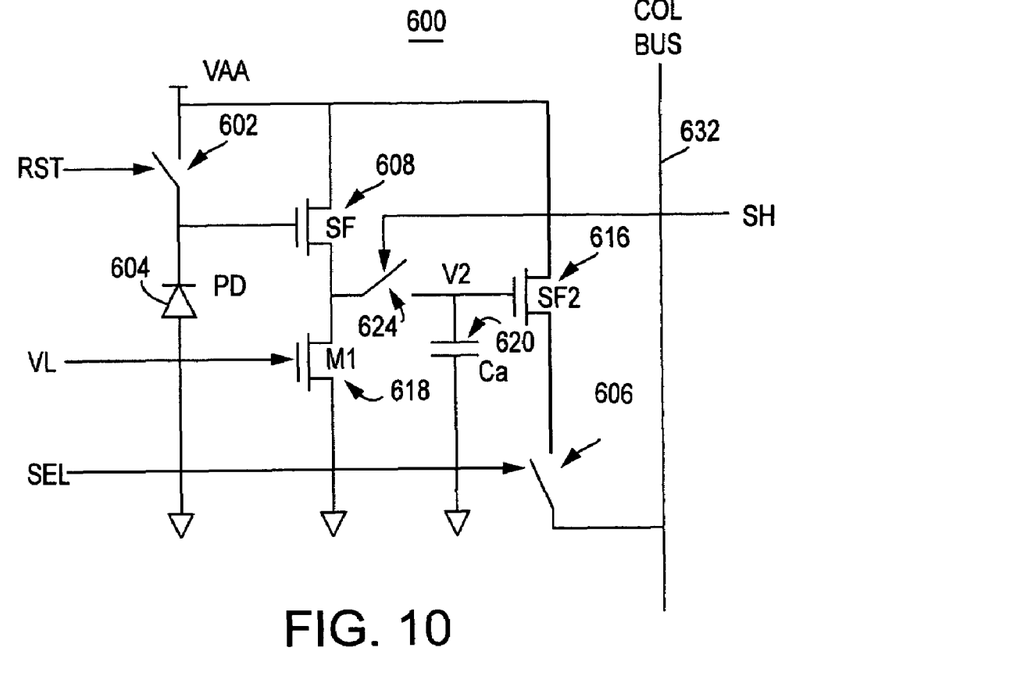
FIG. 10 depicts a schematic diagram of a pixel, in accordance with a fifth exemplary embodiment of the invention.

Turning now to FIG. 10, a schematic diagram of a pixel 600 is depicted, in accordance with a fifth embodiment of the invention. The FIG. 10 pixel 600 is very similar to the pixel cell described in connection with FIG. 4, except for the fact that the clamp circuit (i.e., clamp switch 314 and clamp capacitor 312) has been replaced with a sampling switch (e.g., transistor) 624 and capacitor 620. A first terminal of sampling switch 624 is coupled to the junction at which respective source/drain terminals of source-follower transistor 608 and load transistor 618 meet. A second terminal of sampling switch 624 is coupled to the gate of second source-follower transistor 616 and also coupled to a terminal of capac terminal of capacitor 620 is coupled to ground, or some other low noise bias.

Figure 11:
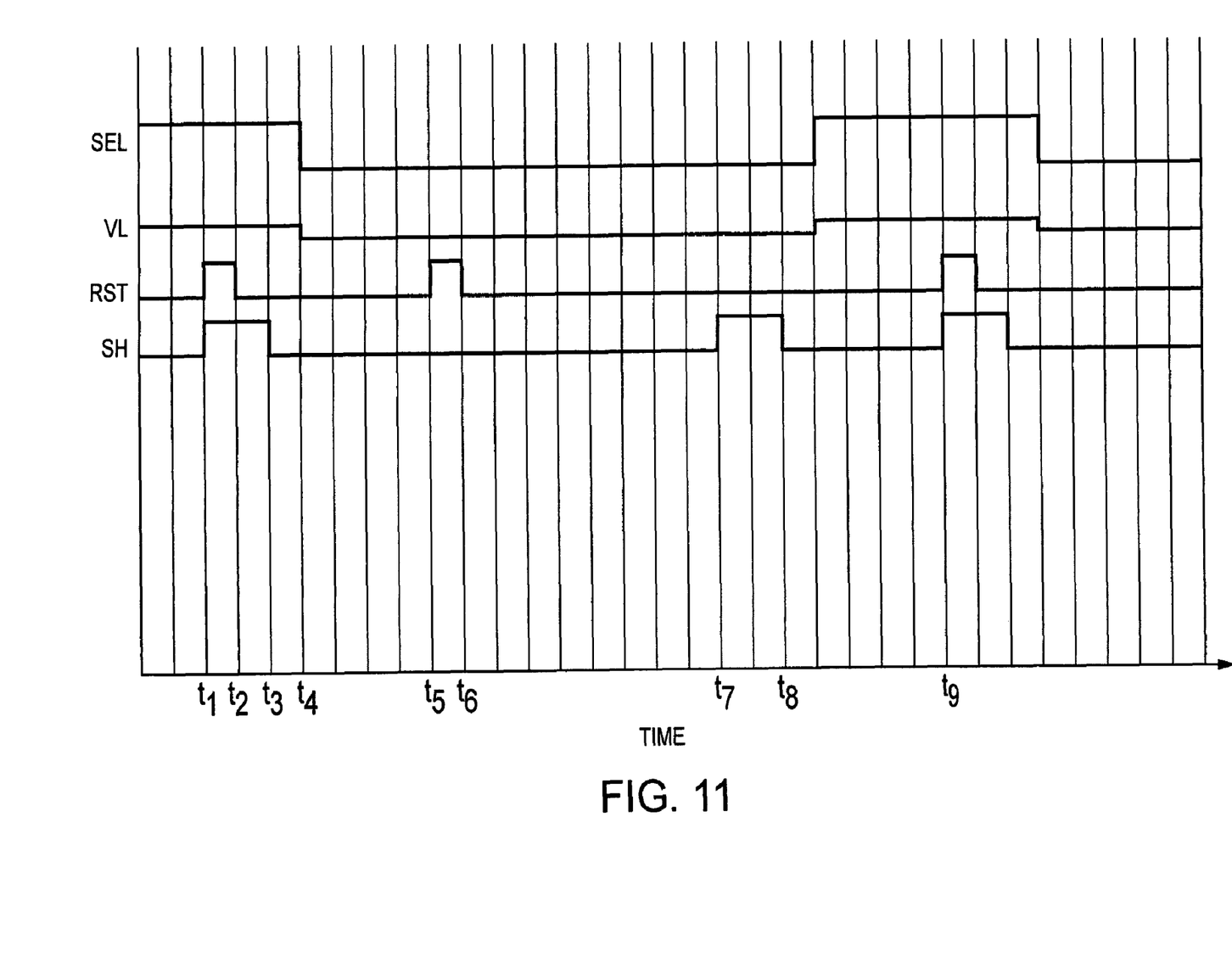
FIG. 11 is a timing diagram describing the operation of the FIG. 10 pixel.

Turning to FIG. 11, the operation of the FIG. 10 pixel is described in connection with a timing diagram. The FIG. 11 timing diagram is similar to that of FIG. 5 except that the CL signal is replaced by the SH signal.

Figure 12:
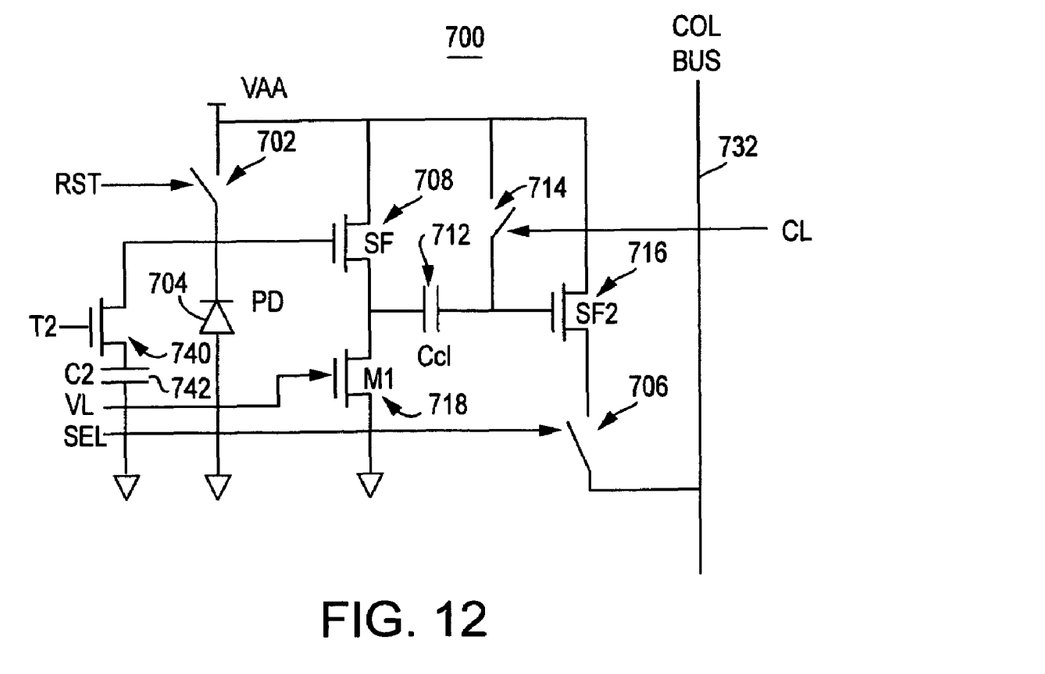
FIG. 12 depicts a schematic diagram of a pixel, in accordance with a sixth exemplary embodiment of the invention.

Turning now to FIG. 12, a schematic diagram of a pixel 700 is depicted in accordance with a sixth exemplary embodiment of the invention. The FIG. 12 pixel 700 is identical to the pixel 300 described in connection with FIG. 4, except for the fact that a barrier transistor 740 and capacitor 742 have been added to the clamp circuit, thereby forming a cascaded integration cell.

The operation of the FIG. 12 pixel 700 is the same as that described for the pixel 300 of FIG. 4, except that once the pixel 700 has been read out onto the column bus 732 after integration, the barrier transistor 740 is activated, thereby coupling capacitor 742 with the capacitance of the photodiode 704. The charge present on the capacitor 742 and the residual charge present on the photodiode 704 is thus shared between the two thereby resulting in reduced conversion gain. The shared voltage is then read out of the pixel 700. As a result, with the three voltage values (i.e., the reset voltage, the signal voltage and the shared voltage) more accurate calculations may be performed in order to determine the actual level of light intensity to which the photodiode 704 was exposed.

Figure 13:
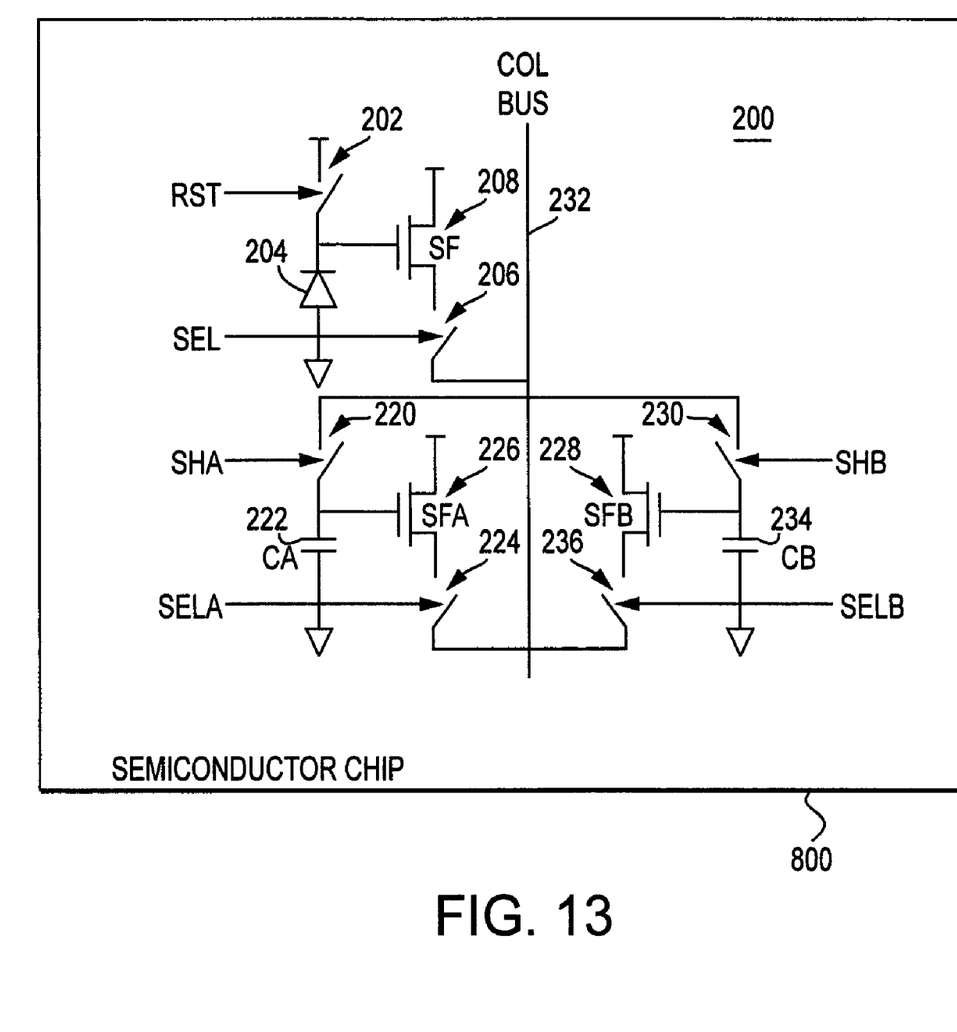
FIG. 13 depicts a semiconductor chip containing the FIG. 2 pixel, in accordance with an exemplary embodiment of the invention.

Turning to FIG. 13, a semiconductor imager device fabricated as an imager chip 800 and containing the FIG. 2 pixel 200 is depicted. The chip 800 may be made of any material suitable for integrating an imager device, including silicon-based materials, glass-based materials, etc. Any of the embodiments described above with reference to FIGS. 2-12 may be integrated on the chip 800. Typically, in addition to the pixel designs described herein, the imager device also includes column read out circuits including sample and hold circuits, difference amplifiers, analog to digital converters for digitizing the amplifier output, and an image processor for synthesizing an image from the digitized pixel signal. Image output circuitry may also be provided as is well known in the art.

Figure 14:
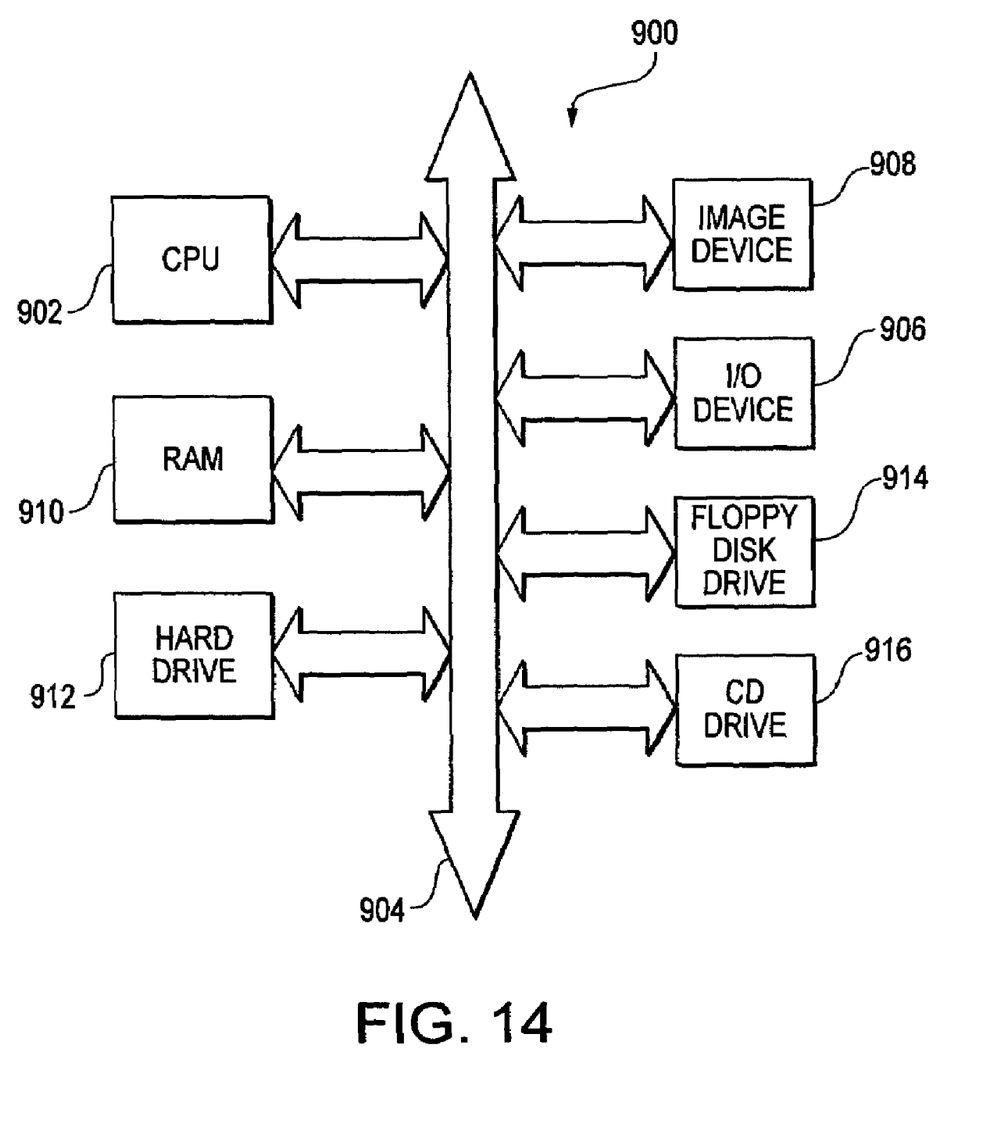
FIG. 14 depicts the FIG. 13 chip coupled to a processor system, in accordance with an exemplary embodiment of the invention.

FIG. 14 shows system 900, a typical processor based system modified to include an imager device 908 containing the chip of FIG. 13. Processor based systems exemplify systems of digital circuits that could include an image sensor. Examples of processor based systems include, without limitation, computer systems, camera systems, scanners, machine vision systems, vehicle navigation systems, video telephones, surveillance systems, auto focus systems, star tracker systems, motion detection systems, image stabilization systems and others, any of which could utilize the invention.

System 900 includes central processing unit (CPU) 902 that communicates with various devices over bus 904. Some of the devices connected to bus 904 provide communication into and out of system 900, illustratively including input/output (I/O) device 906 and imager device 908. Other devices connected to bus 904 provide memory, illustratively including random access memory (RAM) 910, hard drive 912, and one or more peripheral memory devices such as floppy disk drive 914 and compact disk (CD) drive 916.

As described above, it is desirable to reduce the level of kTC noise experienced in a pixel, via in-pixel circuitry, and without consuming excessive power in the process. Exemplary embodiments of the present invention have been described in which kTC noise is reduced using in-pixel circuitry and without consuming excessive power.

While the invention has been described in detail in connection with preferred embodiments known at the time, it should be readily understood that the invention is not limited to the disclosed embodiments. Rather, the invention can be modified to incorporate any number of variations, alterations, substitutions or equivalent arrangements not heretofore described, but which are commensurate with the spirit and scope of the invention. Accordingly, the invention is not limited by the foregoing description or drawings, but is only limited by the scope of the appended claims.

The invention claimed is:

1. An active pixel sensor, comprising:
    a plurality of pixels, wherein each of said pixels comprises:
        a circuit portion for supplying a reset signal and a photosensor charge accumulation signal to a column line;
        a first storage circuit for receiving said reset signal from said column line and storing said reset signal, said first storage circuit comprising a first sample and hold transistor switchably coupling a first terminal of a first storage capacitor with said column line; and
        a second storage circuit for receiving said photosensor charge accumulation signal from said column line and storing said photosensor charge accumulation signal, said second storage circuit comprising a second sample and hold transistor switchably coupling a first terminal of a second storage capacitor with said column line,
        wherein said first and second storage circuits are configured to provide the signals respectively stored therein to said column line during a readout operation.

2. The active pixel sensor of claim 1, wherein said photosensor charge accumulation signal is generated by a photodiode.

3. The active pixel sensor of claim 1, wherein said first terminal of said first storage capacitor is coupled to a gate of a first source follower transistor, a first source/drain terminal of said first source follower transistor is coupled to a supply voltage terminal, and a second source/drain terminal of said first source follower transistor is switchably coupled to said column line.

4. The active pixel sensor of claim 1, wherein said first terminal of said second storage capacitor is coupled to a gate of a second source follower transistor, a first source/drain terminal of said second source follower transistor is coupled to a supply voltage terminal, and a second source/drain terminal of said second source follower transistor is switchably coupled to said column line.

5. A semiconductor chip, comprising:
    an active pixel sensor, said active pixel sensor comprising:
        a plurality of pixels, each of said pixels comprising:
            a circuit portion for supplying a reset signal and a photosensor charge accumulation signal to a column line;
            a first storage circuit for receiving said reset signal from said column line and storing said reset signal, said first storage circuit comprising a first sample and hold transistor switchably coupling a first terminal of a first storage capacitor with said column line; and
            a second storage circuit for receiving said photosensor charge accumulation signal from said column line and storing said photosensor charge accumulation signal, said second storage circuit comprising a second sample and hold transistor switchably coupling a first terminal of a second storage capacitor with said column line,
            wherein said first and second storage circuits are configured to provide the signals respectively stored therein to said column line during a readout operation.

6. The semiconductor chip of claim 5, wherein said photosensor charge accumulation signal is generated by a photodiode.

7. The semiconductor chip of claim 5, wherein said first terminal of said first storage capacitor is coupled to a gate of a first source follower transistor, a first source/drain terminal of said first source follower transistor is coupled to a supply voltage terminal, and a second source/drain terminal of said first source follower transistor is switchably coupled to said column line.

8. The semiconductor chip of claim 5, wherein said first terminal of said second storage capacitor is coupled to a gate of a second source follower transistor, a first source/drain terminal of said second source follower transistor is coupled to a supply voltage terminal, and a second source/drain terminal of said second source follower transistor is switchably coupled to said column line.

9. A processor system, comprising:
    a processor; and
    an imager device coupled to said processor for sending signals to said processor, said imager device comprising:
        a plurality of pixels, each of said pixels comprising:
            a circuit portion for supplying a reset signal and a photosensor charge accumulation signal to a column line;
            a first storage circuit for receiving said reset signal from said column line and storing said reset signal, said first storage circuit comprising a first sample and hold transistor switchably coupling a first terminal of a first storage capacitor with said column line; and
            a second storage circuit for receiving said photosensor charge accumulation signal from said column line and storing said photosensor charge accumulation signal, said second storage circuit comprising a second sample and hold transistor switchably coupling a first terminal of a second storage capacitor with said column line,
            wherein said first and second storage circuits are configured to provide the signals respectively stored therein to said column line during a readout operation.

10. The processor system of claim 9, wherein said photosensor charge accumulation signal is generated by a photodiode.

11. The processor system of claim 9, wherein said first terminal of said first storage capacitor is coupled to a gate of a first source follower transistor, a first source/drain terminal of said first source follower transistor is coupled to a supply voltage terminal, and a second source/drain terminal of said first source follower transistor is switchably coupled to said column line.

12. The processor system of claim 9, wherein said first terminal of said second storage capacitor is coupled to a gate of a second source follower transistor, a first source/drain terminal of said second source follower transistor is coupled to a supply voltage terminal, and a second source/drain terminal of said second source follower transistor is switchably coupled to said column line.

13. A method of operating an active pixel sensor, the method comprising:

resetting a photosensitive element of a pixel, said pixel comprising a circuit portion, a first storage circuit and a second storage circuit;

transferring a reset signal from the circuit portion to a column line;

receiving the reset signal from the column line at the first storage circuit;

storing said reset signal within said first storage circuit, said first storage circuit comprising a first sample and hold transistor switchably coupling a first terminal of a first storage capacitor with said column line;

exposing said photosensitive element to a light source during an integration period while said reset signal is stored within said pixel;

transferring a charge accumulation signal from the circuit portion to a column line;

receiving the charge accumulation signal from the column line at the second storage circuit;

storing within said second storage circuit said charge accumulation signal after said integration period, said reset signal still being stored within said first storage circuit, said second storage circuit comprising a second sample and hold transistor switchably coupling a first terminal of a second storage capacitor with said column line; and reading out said reset signal on said column line.

14. The method of claim 13 further comprising:

reading out said voltage level of said photosensitive element after said integration period; and generating a difference signal corresponding to a level of light to which said photosensitive element was exposed during said integration period.

* * * * *